US011965367B2

(12) United States Patent
Okawa et al.

(10) Patent No.: US 11,965,367 B2
(45) Date of Patent: Apr. 23, 2024

(54) MOTOR-VEHICLE DOOR LATCH DEVICE

(71) Applicant: MITSUI KINZOKU ACT CORPORATION, Kanagawa (JP)

(72) Inventors: Shintaro Okawa, Kanagawa (JP); Takuya Kakumae, Kanagawa (JP)

(73) Assignee: MITSUI KINZOKU ACT CORPORATION, Kanagawa (JP)

( * ) Notice: Subject to any disclaimer, the term of this patent is extended or adjusted under 35 U.S.C. 154(b) by 210 days.

(21) Appl. No.: 17/350,465

(22) Filed: Jun. 17, 2021

(65) Prior Publication Data

US 2021/0396054 A1 Dec. 23, 2021

(30) Foreign Application Priority Data

Jun. 19, 2020 (JP) ................................ 2020-105765

(51) Int. Cl.
*E05B 85/26* (2014.01)
*E05B 85/24* (2014.01)

(52) U.S. Cl.
CPC ............ *E05B 85/26* (2013.01); *E05B 85/243* (2013.01)

(58) Field of Classification Search
CPC ........ E05B 85/20; E05B 85/24; E05B 85/243; E05B 85/26
See application file for complete search history.

(56) References Cited

U.S. PATENT DOCUMENTS 5,979,951 A * 11/1999 Shimura ................. E05B 85/26 292/216
9,611,677 B2 * 4/2017 Bendel .................... E05B 85/26
11,015,375 B2 * 5/2021 Lebsak .................... E05B 85/26
11,591,832 B2 * 2/2023 Kajigai ................. E05B 85/243
2012/0181798 A1 * 7/2012 Margheritti ............. E05B 81/14 292/200
2015/0368934 A1 * 12/2015 Tomaszewski ......... E05B 85/26 292/199
2019/0085601 A1 * 3/2019 Kojima ................... E05B 85/26

FOREIGN PATENT DOCUMENTS

EP 2492423 A2 * 8/2012 ............. E05B 77/36
JP 2019-73854 5/2019

OTHER PUBLICATIONS

Computer Generated Translation for EP 2492423 A2, Generated on Mar. 10, 2023, https://worldwide.espacenet.com/ (Year: 2023).*

* cited by examiner

*Primary Examiner* — Alyson M Merlino
(74) *Attorney, Agent, or Firm* — NIXON & VANDERHYE

(57) ABSTRACT

A motor-vehicle door latch device includes: a main body; a latch that engages with a striker on a vehicle body side when a door is closed, and is capable of moving from an open position to a fully-latched position; a ratchet provided with a pawl that blocks the latch from rotating to an opening direction by respectively engaging with a half-latched engagement portion and a fully-latched engagement portion of the latch; and a third latch lever that engages with a third engagement portion provided on the latch when the latch is in a third latch position between a half-latched position and the open position of the latch so that the third latch lever is capable of blocking the latch from rotating in the opening direction from the third latch position.

9 Claims, 12 Drawing Sheets

MOTOR-VEHICLE DOOR LATCH DEVICE

CROSS-REFERENCE TO RELATED APPLICATIONS

This application claims priority to JP 2020-105765 filed Jun. 19, 2020, the entire content of which is hereby incorporated by reference.

FIELD OF THE INVENTION

The present invention relates to a motor-vehicle door latch device fixed to a door of a motor vehicle.

BACKGROUND OF THE INVENTION

A conventional motor-vehicle door latch device comprises a main body fixed to a door that is supported to a vehicle body and is capable of opening and closing, wherein the main body is provided with a latch that is capable of engaging with a striker on a vehicle body side when the door is closed, a first pole that engages with the latch to block the latch from rotating in an opening direction and to hold the engagement state between the latch and the striker, and a second pole that engages with the first pole to block the first pole from rotating in a direction for disengaging from the latch, and wherein when a door handle (an outside handle or an inside handle) provided on the door is operated to open, the second pole is disengaged from the first pole, the engagement between the first pole and the latch is released, the door is pushed a little in an opening direction by a counterforce of a weatherstrip provided on the vehicle body side, the engagement between the striker and the latch is released, and thereby enabling the door to be operated to open (for example, please see JP 2019-73854 A).

However, in the case where the counterforce of the weatherstrip is extremely lowered by influence such as an aged deterioration, or in the case where the door is adhered to the weatherstrip owing to freezing of water entering into a gap between a periphery of the door and the weatherstrip during parking, even if the door handle is operated to open when the door is closed, the door is not pushed out by the counterforce of the weatherstrip and is kept in a closing position, and thus the motor-vehicle door latch device is brought into a state in which the first pole does not steadily engage with the latch until it reaches a regular position. In this state, that is, in an unsteady engagement state, it is extremely difficult to determine the state of the motor-vehicle door latch device by watching its appearance because the door is almost the same condition as a fully-closed state in appearance.

SUMMARY OF THE INVENTION

Since the conventional motor-vehicle door latch device has such a formation described above, when an occupant operates the door in an opening direction with a large force for reasons such as confirming the closed condition of the door while the unsteady engagement state occurs, the door is sometimes opened. Then, there is not a method to determine whether the unsteady engagement state had occurred in the motor-vehicle door latch device or not.

In view of the above disadvantages, an object of the present invention is to provide a motor-vehicle door latch device having a formation that makes it possible to easily determine whether an unsteady engagement state had occurred or not.

The above problems are solved by the following motor-vehicle door latch device of the present invention. Namely, the motor-vehicle door latch device of the present invention comprises;

- a main body fixed to a door;
- a latch that is supported to the main body pivotably at a predetermined angle, is rotated in a closing direction from an open position by engaging with a striker on a vehicle body side when the door is closed and is capable of moving to a fully-latched position via a half-latched position;
- a ratchet supported to the main body pivotably at a predetermined angle and provided with a pawl that blocks the latch from rotating to an opening direction by respectively engaging with a half-latched engagement portion and a fully-latched engagement portion of the latch engaged with the striker; and
- a third latch lever that is supported to the main body pivotably at a predetermined angle to engage with a third engagement portion provided on the latch when the latch is in a third latch position between the half-latched position and the open position of the latch so that the third latch lever is capable of blocking the latch from rotating in the opening direction from the third latch position.

According to the present invention, in the case of the unsteady engagement state, when the pawl of the ratchet disengages from the latch, the third latch lever engages with the third engagement portion provided on the latch in the third latch position of the latch to block the latch from further rotating in the opening direction from the third latch position, and thereby stopping the door in the door-half-open-state determinable position. Therefore, an occupant can easily determine by watching an appearance of the door condition that the motor-vehicle door latch device had been in the unsteady engagement state.

EMBODIMENTS OF THE INVENTION

Figure 1:
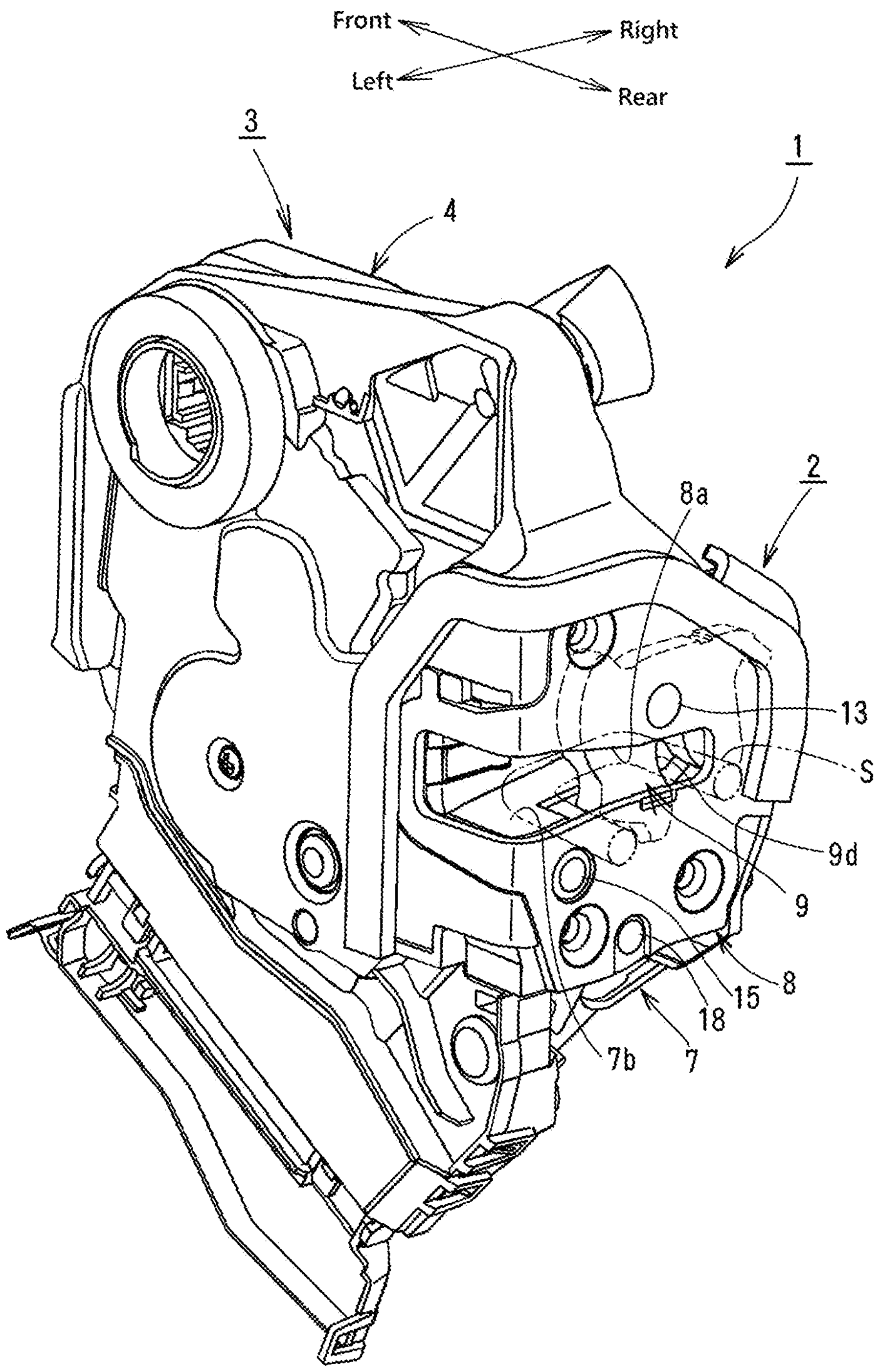
FIG. 1 is a perspective view showing a motor-vehicle door latch device of the present invention.
Figure 2:
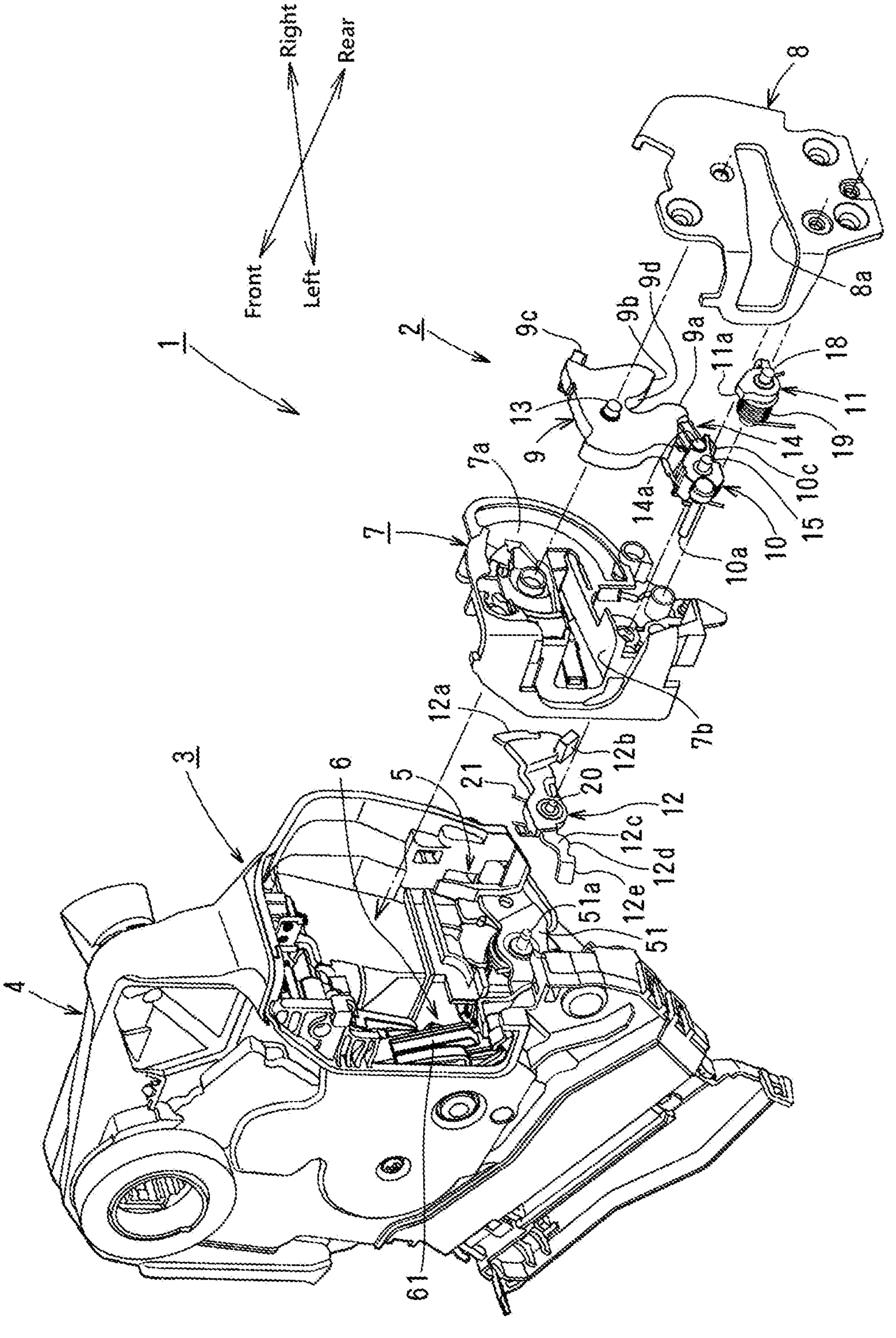
FIG. 2 is an exploded perspective view showing the motor-vehicle door latch device.
Figure 3:
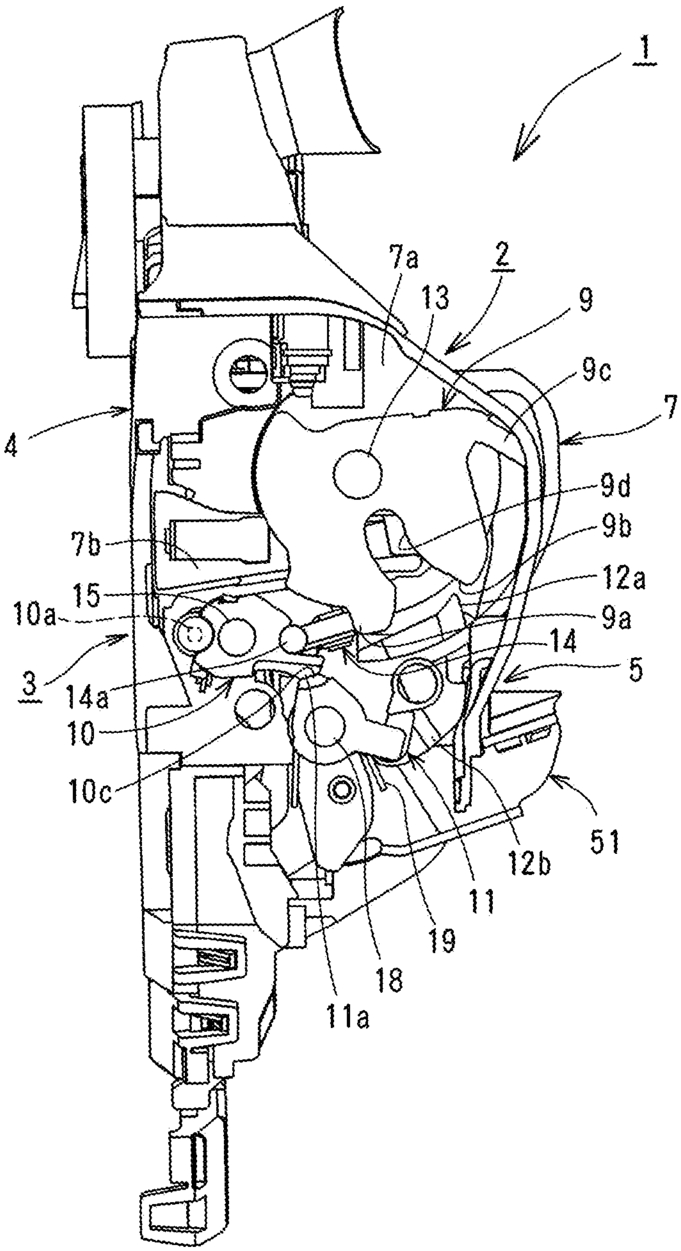
FIG. 3 is a front view showing the motor-vehicle door latch device in a state of removing a cover plate.
Figure 4:
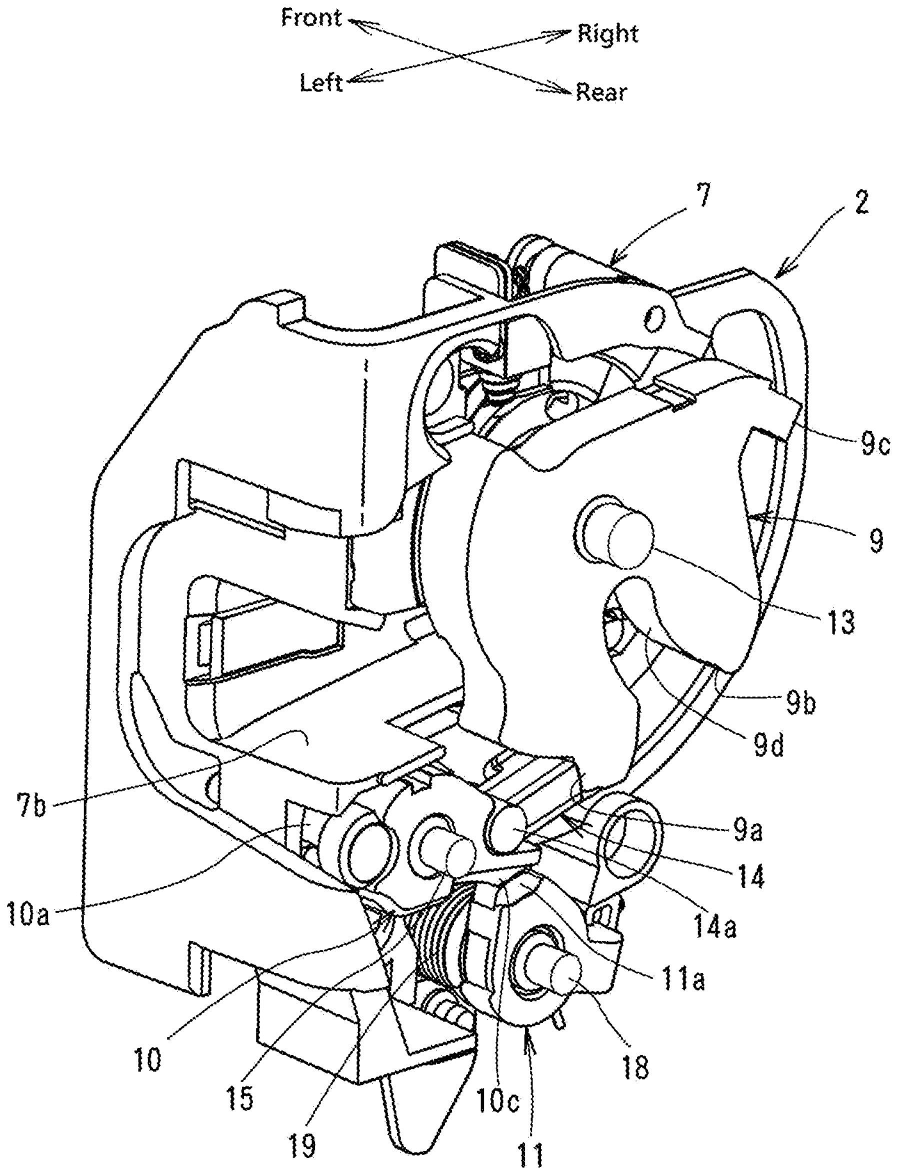
FIG. 4 is a perspective view showing a principal part of an engagement assembly.
Figure 5:
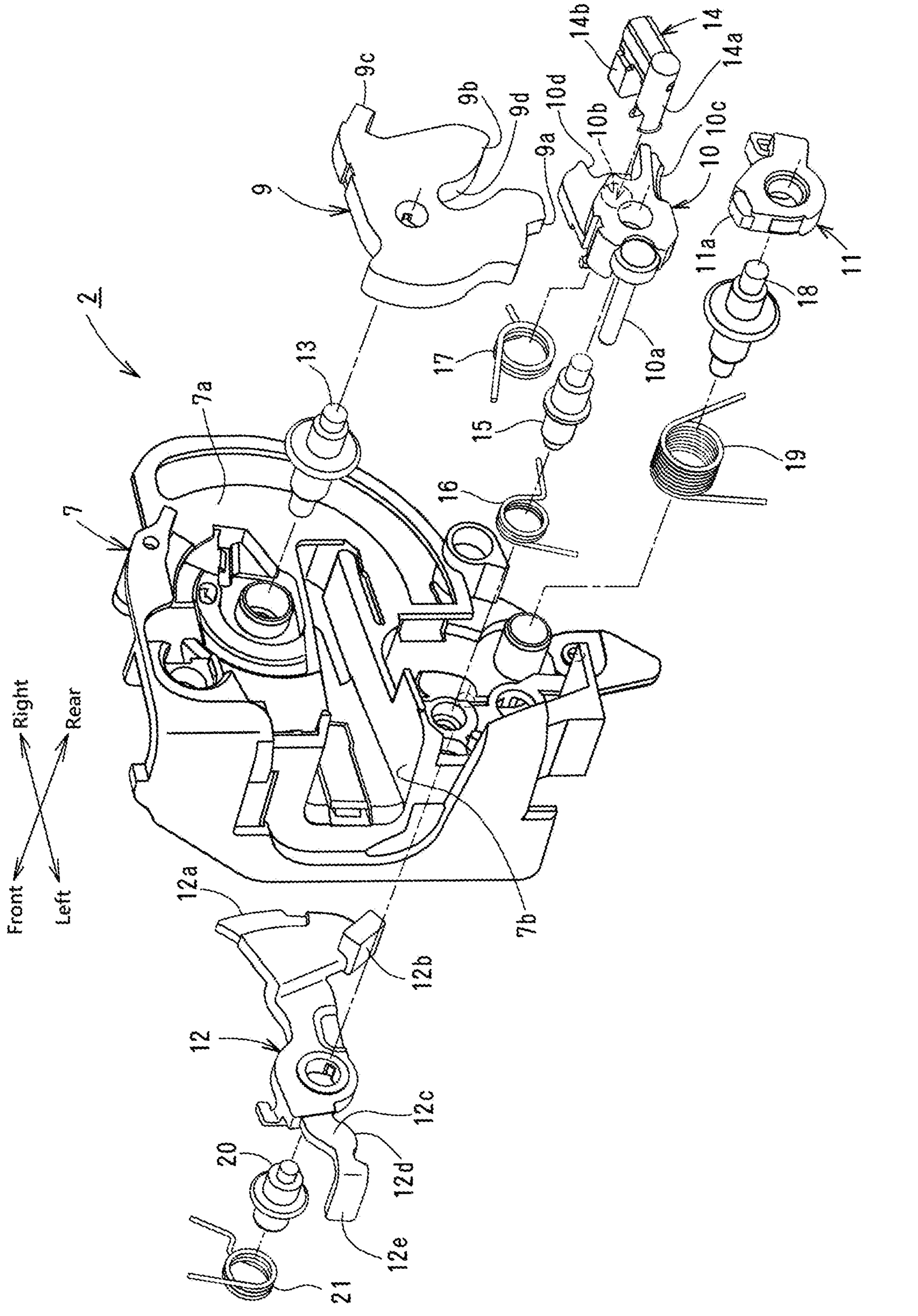
FIG. 5 is an exploded perspective view showing the engagement assembly.
Figure 6:
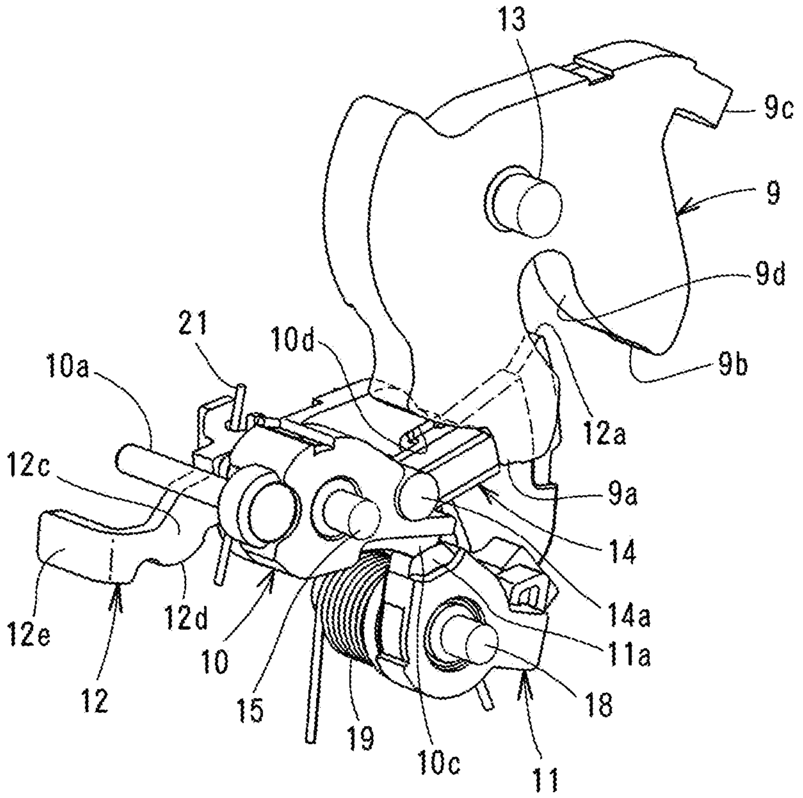
FIG. 6 is a perspective view showing a principal part.

An embodiment according to the present invention is described with the drawings as follows. As shown in FIGS. 1 to 3, a motor-vehicle door latch device 1 is fixed to a door (not shown) that is supported to a vehicle body to be capable of opening and closing, and the motor-vehicle door latch device 1 is provided with an engagement assembly 2 and an operation assembly 3 arranged in a front side of the engagement assembly 2, wherein the engagement assembly 2 comprises a plurality of engagement members for holding the door closed by engaging with a striker S on a vehicle body side and the operation assembly 3 comprises operating members capable of operating predetermined engagement members among the plurality of engagement members.

The operation assembly 3 has a casing 4 made of a synthetic resin, which forms an outer shell fixed to a front surface of a body 7 described below of the engagement assembly 2. The operation assembly 3 is formed by arranging a release mechanism 5 and a locking/unlocking mechanism 6 in the casing 4, wherein the release mechanism 5 comprises operating members capable of operating predetermined engagement members of the engagement assembly 2 and the locking/unlocking mechanism 6 comprises operating members capable of shifting operation of the release mechanism 5 between transmittable and untransmittable to the engagement members.

The release mechanism 5 comprises;

- an outside lever 51 that is supported in the casing 4 pivotably at a predetermined angle by a shaft 51*a*, and is in conjunction with a door opening operation of an outside handle (not shown) provided on a vehicle-exterior side surface of the door;
- an inside lever (not shown) that is supported in the casing 4 by a shaft (not shown), and is in conjunction with a door opening operation of an inside handle (not shown) provided on a vehicle-interior side surface of the door;
- a motor (not shown) that is housed in the casing 4, and is driven based on an operation of a remote control switch carried by a user; and so forth,
- wherein when the locking/unlocking mechanism 6 is in an unlocked state described below, a releasing lever (not shown) operated by driving of the outside lever 51 or by driving of the motor is operated for releasing by an opening operation of the outside handle or the inside handle or by driving of the motor based on an operation of the remote control switch, this releasing operation is transmitted to a ratchet 10 described below of the engagement assembly 2, an engagement between a latch 9 described below of the engagement assembly 3 and a striker S is released, and thereby enabling the door to be opened. Incidentally, each of the outside lever 51 and the releasing lever in the present embodiment corresponds to a door-release-operation lever of the present invention.

The locking/unlocking mechanism 6 comprises a locking lever 61 capable of moving between an unlocked position and a locked position with a motive power of a motor (not shown) that is driven based on a manual operation of a key cylinder (not shown) provided on the vehicle-exterior side surface of the door and a locking knob (not shown) provided on the vehicle-interior side surface of the door, and is driven based on a locking/unlocking operation of the remote control switch. When the locking/unlocking mechanism 6 is in the unlocked state owing to that the locking lever 61 is in the unlocked position, the opening operations respective of the outside handle and the inside handle are enabled to make the door capable of opening. When the locking/unlocking mechanism 6 is in the locked state owing to that the locking lever 61 is in the locked position, the opening operations respective of the outside handle and the inside handle are disabled to make the door incapable of opening. However, the door can be always opened independently of the state of the locking/unlocking mechanism 6 by the motive power of the motor based on the releasing operation of the remote control switch. Incidentally, a detailed explanation and a drawing of the locking/unlocking mechanism 6 are omitted because the locking/unlocking mechanism 6 is not directly concerned with the present invention.

As shown in FIGS. 2 to 6, the engagement assembly 2 comprises;

- a main body (not indicated by a reference sign) comprising the body 7 that is made of a synthetic resin and is fixed to an interior surface of the door by bolts (not shown) and a cover plate 8 that is made of metal and closes an opening on a rear surface side of the body 7;
- the latch 9, the ratchet 10, and a holding lever 11 which are the engagement members arranged in a housing part 7*a* between the body 7 and the cover plate 8; and
- a third latch lever 12 that is the engagement member arranged on a front surface side of the body 7.

Incidentally, the cover plate 8 is omitted from FIG. 3 to clearly show each of the engagement members arranged in the housing part 7*a* of the body 7.

The body 7 comprises the housing part 7*a* and a striker entrance groove 7*b*, wherein a rear surface side of the housing part 7*a* is opened to arrange the latch 9, the ratchet 10, and the holding lever 11, and wherein the striker entrance groove 7*b* is formed in a center portion in a vertical direction of the housing part 7*a* and the striker S can enter into the striker entrance groove 7*b* from a horizontal direction when the door is closed.

The cover plate 8 is fixed to the body 7 to close the housing part 7*a* of the body 7 from the rear surface side. The cover plate 8 has a striker entrance notch 8*a* into which the striker S can enter from the horizontal direction when the door is closed.

Figure 7:
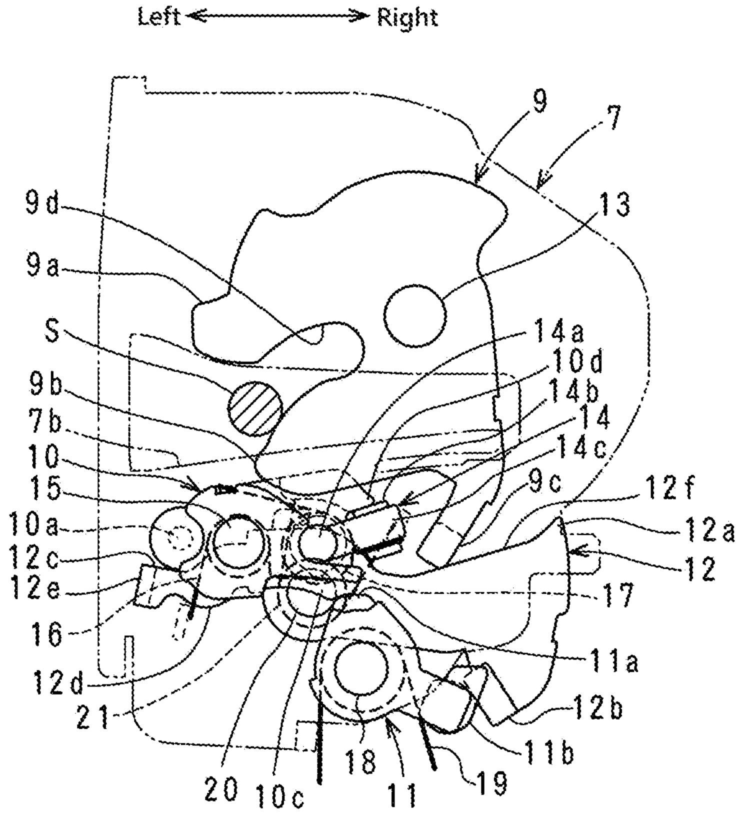
FIG. 7 is a front view showing the principal part in an open state.
Figure 8:
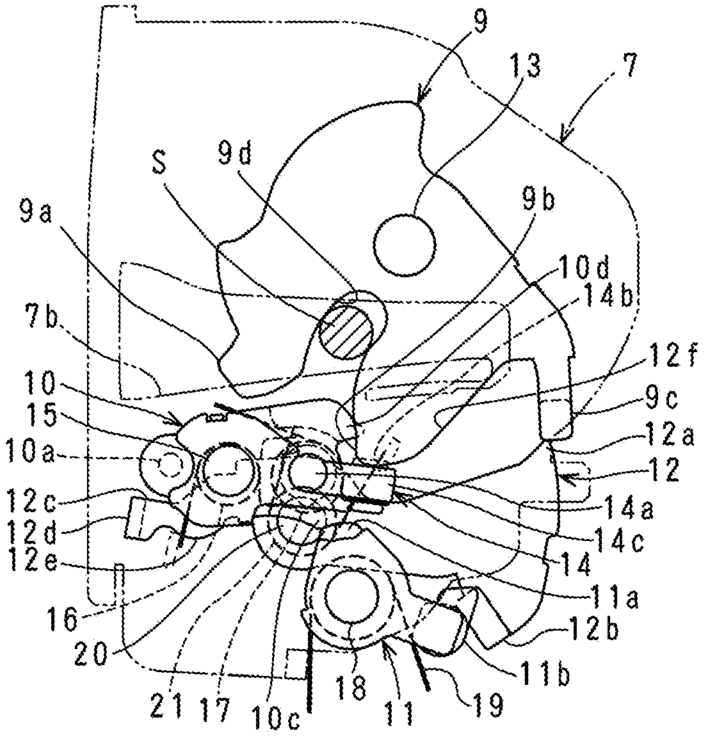
FIG. 8 is a front view showing the principal part in a halfway state of closing operation.
Figure 9:
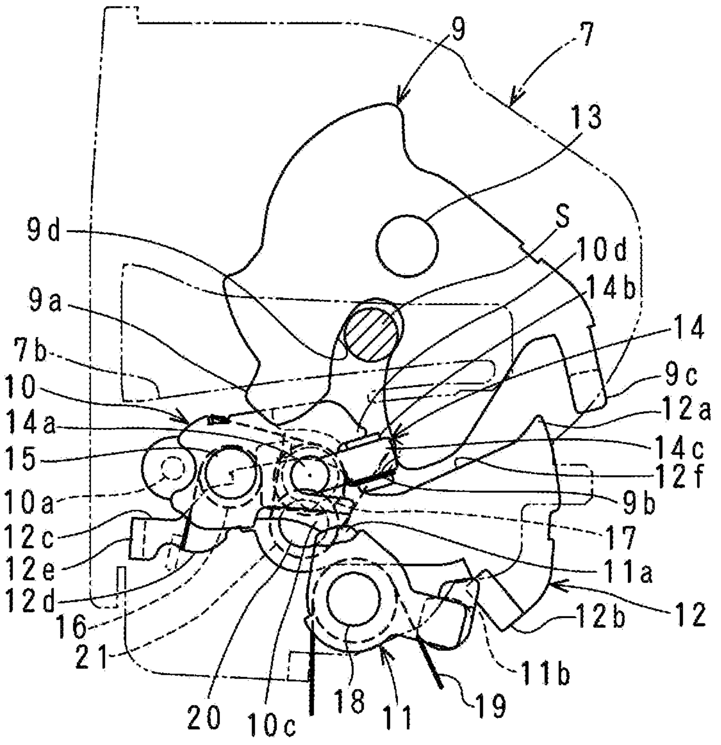
FIG. 9 is a front view showing the principal part in a half-latched state.
Figure 10:
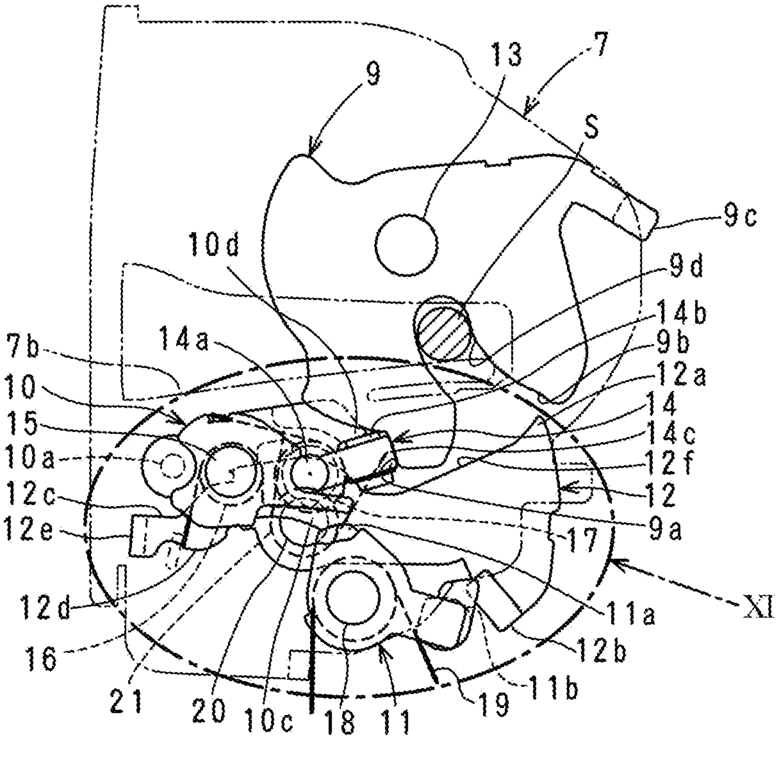
FIG. 10 is a front view showing the principal part in a fully-latched state.

The latch 9 is supported in the housing part 7*a* of the body 7 pivotably at a predetermined angle by a shaft 13 oriented in a longitudinal direction, is biased in an opening direction (a clockwise direction in FIG. 3) by a spring (not shown), is rotated in a closing direction (a counterclockwise direction in FIG. 7) from an open position shown in FIG. 7 corresponding to an open position of the door against a biasing force of the spring when the striker S enters into the striker entrance groove 7*b* of the body 7 and the striker entrance notch 8*a* of the cover plate 8 owing to a closing operation of the door, and is rotated to a fully-latched position shown in FIG. 10 corresponding to a fully-closed position of the door via a half-latched position corresponding to a half-door position of the door shown in FIGS. 8, 9.

A peripheral portion of the latch 9 is provided with a fully-latched engagement portion 9*a*, a half-latched engagement portion 9*b*, and a third engagement portion 9*c*, wherein the fully-latched engagement portion 9*a* is capable of engaging with a pawl 14 formed on an end portion of the ratchet

Figure 16:
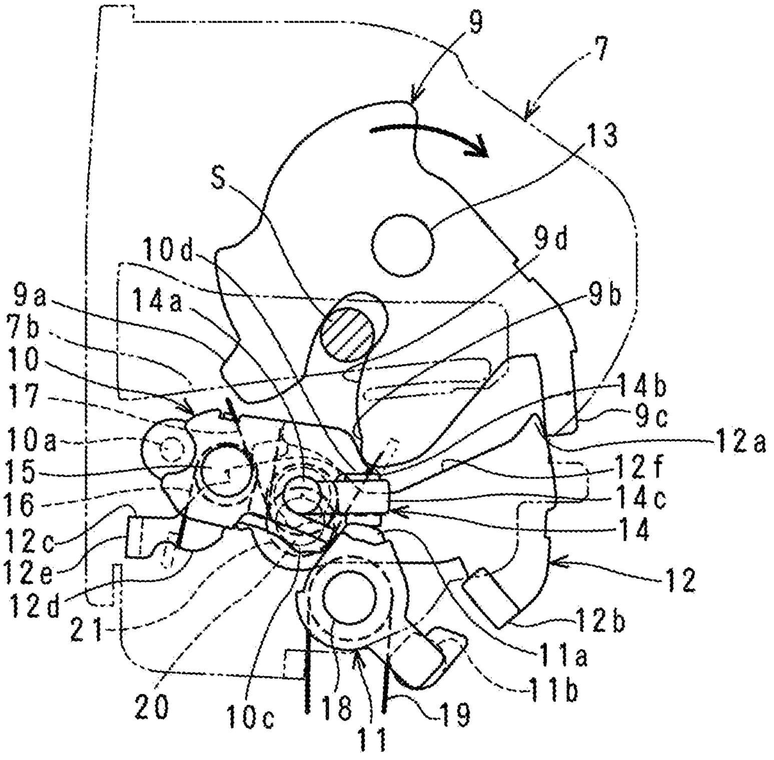
FIG. 16 is a front view showing the principal part in a third latch state.

10 when the latch 9 is in the fully-latched position shown in FIG. 10, wherein the half-latched engagement portion 9*b* is capable of engaging with the pawl 14 of the ratchet 10 when the latch 9 is in the half-latched position shown in FIG. 9, and wherein the third engagement portion 9*c* is capable of engaging with a pawl portion 12*a* formed at one end portion of the third latch lever 12 when the latch 9 is in a third latch position shown in FIG. 16, the third latch position being between the open position and the half-latched position and corresponding to a door-half-open-state determinable position where a half-open state of the door can be determined. Moreover, an engagement groove 9*d* is formed between the fully-latched engagement portion 9*a* and the half-latched engagement portion 9*b* of the latch 9, and the striker S entering into the striker entrance groove 7*b* of the body 7 and the striker entrance notch 8*a* of the cover plate 8 can engage with the engagement groove 9*d* when the door is closed.

The ratchet 10 is supported in the housing part 7*a* of the body 7 pivotably at a predetermined angle by a shaft 15 oriented in the longitudinal direction, is biased in an engagement direction (the counterclockwise direction in FIG. 3 and corresponding to a second engagement direction in the present invention) by a biasing force of a spring 16 (corresponding to a third spring of the present invention) wound on the shaft 15, and is rotated in a releasing direction (the clockwise direction in FIGS. 3, 9, 10) from an engagement position shown in FIGS. 3, 9, 10 against the biasing force of the spring 16 based on the releasing operation of the outside lever 51 and the releasing lever. Moreover, the pawl 14 capable of respectively engaging with the fully-latched engagement portion 9*a* and the half-latched engagement portion 9*b* of the latch 9 is provided on one end portion of the ratchet 10 so as to be pivotable at a predetermined angle around a shaft oriented in the longitudinal direction, and an abutted portion 10*a* formed in a cylindrical shape and protruding forward is provided at the other end portion.

Incidentally, the biasing force of the spring 16 to bias the ratchet 10 in the engagement direction is smaller than that of a usual door latch device. Thus, an operating force for rotating the ratchet 10 in the releasing direction is reduced, and the door can be opened by a small operating force. Moreover, when the ratchet 10 is in the engagement position, the ratchet 10 is held in the engagement position by the holding lever 11 as described below to ensure the respective engagements of the pawl 14 of the ratchet 10 with the fully-latched engagement portion 9*a* and the half-latched engagement portion 9*b*.

Figure 11:
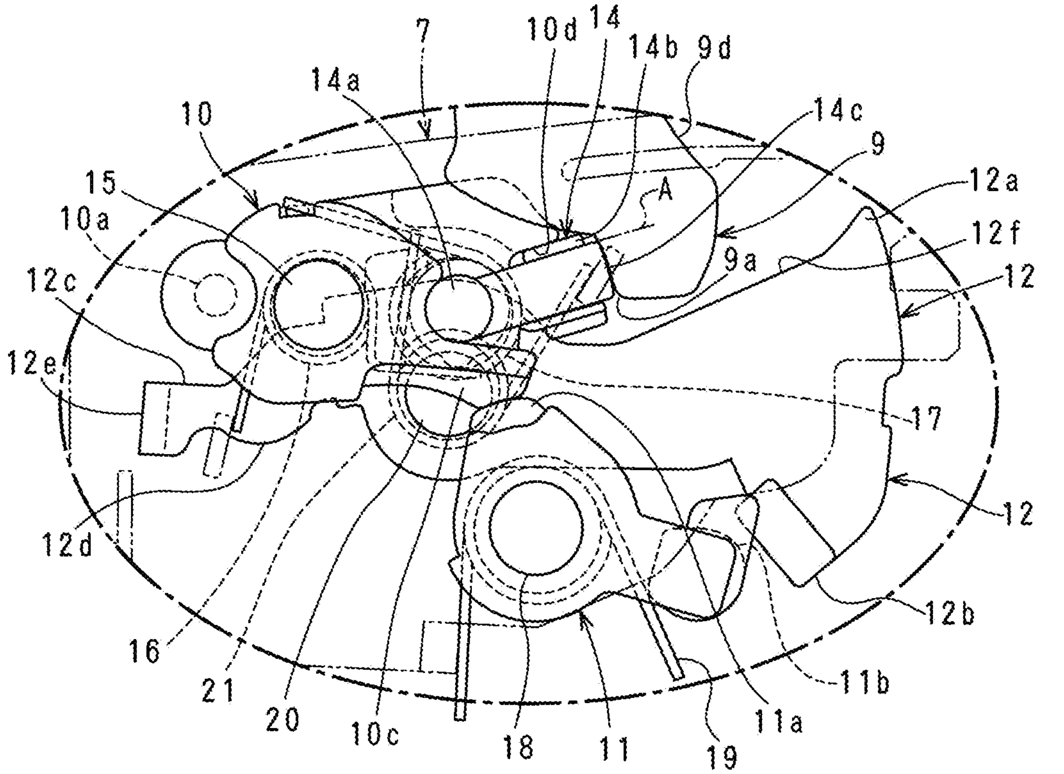
FIG. 11 is an enlarged view taken along the arrow XI in FIG. 10.
Figure 12:
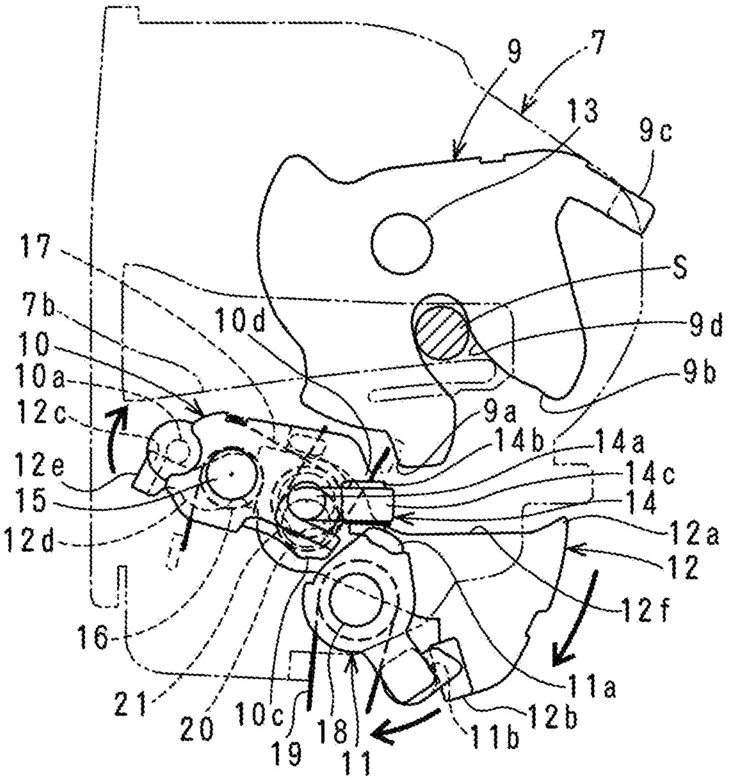
FIG. 12 is a front view showing the principal part in a state of releasing operation.

The pawl 14 is supported in a shaft hole 10*b* (see FIG. 5) formed in the end portion of the ratchet 10 by a shaft portion 14*a* oriented in the longitudinal direction so as to be pivotable at a predetermined angle. A tip portion of the pawl 14 is biased in an engagement direction (for example, the counterclockwise direction in FIG. 3 corresponding to a first engagement direction in the present invention) to respectively engage with the fully-latched engagement portion 9*a* and the half-latched engagement portion 9*b* of the latch 9 by a biasing force of a spring 17 (corresponding to a second spring of the present invention) of which one end portion is hooked on the pawl 14 and the other end portion is hooked on the ratchet 10. Normally, the pawl 14 is held in an engagement position (for example, a position shown in FIG. 11) where an abutting portion 14*b* formed on an upper surface of the pawl 14 abuts against an abutted portion 10*d* formed on the ratchet 10 from below with the biasing force of the spring 17. Thus, when the ratchet 10 is in the engagement position, the pawl 14 engages with the fully-latched engagement portion 9*a* or the half-latched engagement portion 9*b* of the latch 9 to hold the latch 9 in the fully-latched position or the half-latched position. As shown in FIG. 12, when the ratchet 10 rotates in the releasing direction, the pawl 14 disengages from the fully-latched engagement portion 9*a* or the half-latched engagement portion 9*b* of the latch 9, and thereby allowing the latch 9 to rotate in the opening direction.

The holding lever 11 is provided below the ratchet 10, is supported to the housing part 7*a* of the body 7 pivotably at a predetermined angle by a shaft 18 oriented in the longitudinal direction, and is biased in a holding direction (the counterclockwise direction in FIG. 3) by a spring 19 of which one end portion is hooked on the body 7 and the other end portion is hooked on the holding lever 11. Normally, for example, as shown in FIG. 11, a holding portion 11*a* formed on an upper-end portion of the holding lever 11 abuts against a held portion 10*c* formed on a lower portion of the ratchet 10 from below to block the ratchet 10 from the rotation in the releasing direction (a direction in which the pawl 14 disengages from the fully-latched engagement portion 9*a* or the half-latched engagement portion 9*b* of the latch 9, for example, the clockwise direction in FIG. 11) around the shaft 15 from the engagement position. Moreover, the holding lever 11 rotates in the clockwise direction at a predetermined angle against a biasing force of the spring 19 to disengage the holding portion 11*a* from the held portion 10*c* of the ratchet 10, and thereby allowing the ratchet 10 to rotate in the releasing direction.

The third latch lever 12 is supported to the front surface side of the body 7 pivotably at a predetermined angle by a shaft 20 oriented in the longitudinal direction, and is biased in the counterclockwise direction by a spring 21 (corresponding to a first spring of the present invention) of which one end portion is hooked on the third latch lever 12 and the other end portion is hooked on the body 7. The third latch lever 12 rotates in a retreating direction (the clockwise direction in FIG. 10) at a predetermined angle from a standby position exemplarily shown in FIG. 10 to a retreating position shown in FIG. 12 against a biasing force of the spring 21 in conjunction with the releasing operation of the outside lever 51 based on the door opening operation of the outside handle or the inside handle, or the releasing operation of the releasing lever based on the motive power of the motor. Incidentally, the releasing operation of the outside lever 51 is transmitted to the third latch lever 12 by abutting a sub lever (not shown) coupled with the outside lever 51 against one portion 12*d* of the third latch lever 12 from below. Moreover, the releasing operation of the releasing lever with the motor is transmitted to the third latch lever 12 by abutting the releasing lever against a bent portion 12*e* formed at the other end portion of the third latch lever 12 from below.

Moreover, the third latch lever 12 has the pawl portion 12*a* capable of engaging with the third engagement portion 9*c* when the latch 9 is in the third latch position, a first abutting portion 12*b* that is provided at a lower-right end portion of the third latch lever 12 and is capable of abutting against an abutted portion 11*b* formed at a lower end portion of the holding lever 11 when the third latch lever 12 is rotated in the retreating direction from the standby position, and a second abutting portion 12*c* that is formed at a left end portion of the third latch lever 12 and is capable of abutting against the abutted portion 10*a* of the ratchet 10.

As shown in FIG. 16, the pawl portion 12*a* of the third latch lever 12 engages with the third engagement portion 9*c* of the latch 9 in the standby position of the third latch lever 12 to block the latch 9 from rotating in the opening direction from the third latch position. As shown in FIG. 12, the pawl portion 12*a* retreats from a movement locus of the third engagement portion 9*c* of the latch 9 in the retreating position of the third latch lever 12 to allow the latch 9 to rotate in the opening direction.

When the third latch lever 12 rotates in the retreating direction from the standby position, the first abutting portion 12*b* abuts against the abutted portion 11*b* of the holding lever 11 to rotate the holding lever 11 in the allowed direction (the clockwise direction in FIG. 10) from the blocking position (for example, a position shown in FIG. 10).

When the third latch lever 12 rotates in the retreating direction from the standby position, the second abutting portion 12*c* abuts against the abutted portion 10*a* of the ratchet 10 from below to rotate the ratchet 10 in the releasing direction from the engagement position.

In the case where the latch 9 rotates in the opening direction from the fully-latched position or the half-latched position in an unsteady engagement state of the motor-vehicle door latch device 1, when the latch 9 reaches the third latch position between the open position and the half-latched position, the pawl portion 12*a* engages with the third engagement portion 9*c* of the latch 9 to block the latch 9 from rotating in the opening direction. Moreover, the second abutting portion 12*c* abuts against the abutted portion 10*a* of the ratchet 10 after the holding portion 11*a* completely disengages from the held portion 10*c* of the ratchet 10 by abutting the first abutting portion 12*b* against the abutted portion 11*b* of the holding lever 11 to rotate the holding lever 11 in the allowed direction.

Incidentally, when the latch 9 is positioned in the opening direction side of the third latch position shown in FIG. 16, a tip portion of the third engagement portion 9*c* of the latch 9 abuts against the upper edge portion 12*f* of the third latch lever 12 from above so that the third latch lever 12 is held in an intermediate position where the third latch lever 12 is slightly rotated in the retreating direction (the clockwise direction) from the stand by position. When the latch 9 is positioned in the closing direction side (the counterclockwise direction side in FIG. 16) of the third latch position, the third latch lever 12 is in the standby position where the pawl portion 12*a* enters into the movement locus of the third engagement portion 9*c* of the latch 9.

Next, based on FIGS. 7 to 16, there is described an operation of the motor-vehicle door latch device 1 of the present invention.

At first, a closing operation of the door is described.

When the door is in an open state, as shown in FIG. 7, the latch 9 is in the open position, the ratchet 10 and the pawl 14 are in the respective engagement positions, the holding lever 11 is in the blocking position where the holding portion 11*a* abuts against the held portion 10*c* of the ratchet 10, and the third latch lever 12 is in the intermediate position where the third engagement portion 9*c* of the latch 9 abuts against the upper edge portion 12*f*.

When the door is closed from this state, as shown in FIG. 8, the striker S enters into the striker entrance groove 7*b* of the body 7 and the striker entrance notch 8*a* of the cover plate 8 to engage with the engagement groove 9*d* of the latch 9. Thus, the latch 9 rotates around the shaft 13 in the closing direction (the counterclockwise direction in FIG. 7) from the open position. In this case, as shown in FIG. 8, owing to the rotation of the latch 9 in the closing direction, the tip portion of the third engagement portion 9*c* slidably moves in a right direction while it contacts the upper edge portion 12*f* of the third latch lever 12, and the tip portion of the half-latched engagement portion 9*b* contacts the upper surface of the pawl 14 to forcibly move only the pawl 14 in the retreating and releasing direction against the biasing force of the spring 17 while the ratchet 10 is held in the engagement position.

Then, as shown in FIG. 9, when the latch 9 reaches the half-latched position, the pawl 14 engages with the half-latched engagement portion 9*b* of the latch 9 with the biasing force of the spring 17, and the third latch lever 12 rotates from the intermediate position to the standby position with the biasing force of the spring 21.

Moreover, owing to the closing operation of the door, when the latch 9 further rotates in the closing direction, the latch 9 moves the pawl 14 in the retreating and releasing direction again because the tip portion of the fully-latched engagement portion 9*a* of the latch 9 contacts the upper surface of the pawl 14. Then, as shown in FIG. 10, when the latch 9 reaches the fully-latched position corresponding to the fully-closed position of the door, the pawl 14 returns to the engagement position with the biasing force of the spring 17 to engage with the fully-latched engagement portion 9*a* of the latch 9, and thereby holding the door in the fully-closed position. When the pawl 14 steadily engages with the fully-latched engagement portion 9*a* until it reaches a regular position, as shown in FIG. 11, the tip portion 14*c* of the pawl 14 is positioned in a point A (see FIG. 11) where the pawl 14 deeply engages with the fully-latched engagement portion 9*a*, and the holding lever 11 blocks the ratchet 10 from rotating in the releasing direction by abutting the holding portion 11*a* against the held portion 10*c* of the ratchet 10.

As described above, in the motor-vehicle door latch device 1, when the latch 9 is rotated in the closing direction, only the pawl 14 that is a comparatively small member is rotated in the releasing direction in conjunction with the rotation of the latch 9 in the closing direction, without a whole of the ratchet 10 that is a comparatively large member is rotated in the releasing direction. Therefore, it is possible to improve a door closing sound when the door is closed to be more silent and to obtain an excellent door closing sound. When the latch 9 is in the fully-latched position and the pawl 14 provided with the ratchet 10 is engaged with the fully-latched engagement portion 9*a* of the latch 9, the holding portion 11*a* of the holding lever 11 abuts against the held portion 10*c* of the ratchet 10 to block the ratchet 10 from rotating in the releasing direction. Therefore, it is possible to make the engagement of the pawl 14 with the fully-latched engagement portion 9*a* steady.

Next, an opening operation of the door is explained.

As shown in FIGS. 10, 11, when the door is held in a fully-closed state, the latch 9 is in the fully-latched position, the ratchet 10 and the pawl 14 are in the respective engagement positions, the pawl 14 is engaged with the fully-latched engagement portion 9*a* of the latch 9, the holding lever 11 is in the blocking position where the holding portion 11*a* abuts against the held portion 10*c* of the ratchet 10, and the third latch lever 12 is in the standby position where the pawl portion 12*a* enters into the movement locus of the third engagement portion 9*c* of the latch 9.

In the case where the locking/unlocking mechanism 6 is in the unlocked state in the above-described situation, when the outside handle or the inside handle is operated to open the door, or when the motor is operated to release based on the releasing operation of the remote control switch, the third latch lever 12 is rotated in the retreating direction at a predetermined angle from the standby position to the retreating position shown in FIG. 12. Owing to this rotation, the first abutting portion 12*b* of the third latch lever 12 abuts against the abutted portion 11_b_ of the holding lever 11 to rotate the holding lever 11 in the allowed direction (the clockwise direction in FIG. 10) from the blocking position, and thereby moving the holding portion 11_a_ in a direction to disengage from the held portion 10_c_ of the ratchet 10. After the holding portion 11_a_ of the holding lever 11 completely disengages from the held portion 10_c_ of the ratchet 10, the second abutting portion 12_c_ of the third latch lever 12 abuts against the abutted portion 10_a_ of the ratchet 10 from below to rotate the ratchet 10 in the releasing direction from the engagement position, and thereby releasing the pawl 14 from the fully-latched engagement portion 9_a_ of the latch 9. Thus, the latch 9 is allowed to rotate from the fully-latched position to the opening direction, normally, the door is pushed in the opening direction by a counterforce of a weatherstrip provided on a periphery of a door opening part, the latch 9 is rotated to the open position, the striker S is exited from the engagement groove 9_d_ of the latch 9, and thereby enabling the door to be opened.

After the door is opened, when the door opening operation of the outside handle or the inside handle is stopped, or when the driving of the motor is stopped, the ratchet 10 is returned to the engagement position with the biasing force of the spring 16, the holding lever 11 is rotated to the blocking position by the biasing force of the spring 19, the third latch lever 12 is rotated to the intermediate position, and thereby reaching an open state shown in FIG. 7.

Next, an operation when the unsteady engagement state occurs is described.

Normally, as described above, when the locking/unlocking mechanism 6 of the motor-vehicle door latch device 1 is in the unlocked state, the door is pushed in the opening direction by the counterforce of the weatherstrip owing to the opening operation of the outside handle and so forth, and thus the door is opened. However, in the case where the counterforce of the weatherstrip is lowered by influence such as an aged deterioration or it is under an environment of winter, even if the outside handle is operated to open, the door is not pushed by the counterforce of the weatherstrip so that the latch 9 is sometimes stopped in the fully-latched position (or a position where the latch 9 is slightly moved in the opening direction), or movements of the respective members are sometimes lost owing to freezing of movable parts and so on.

Figure 13:
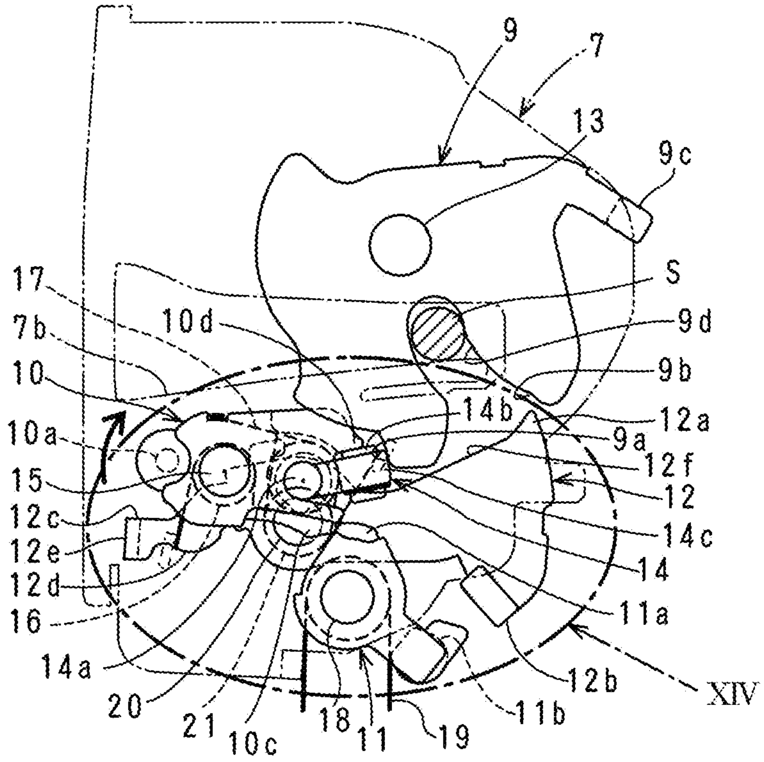
FIG. 13 is a front view showing the principal part in an unsteady engagement state.
Figure 14:
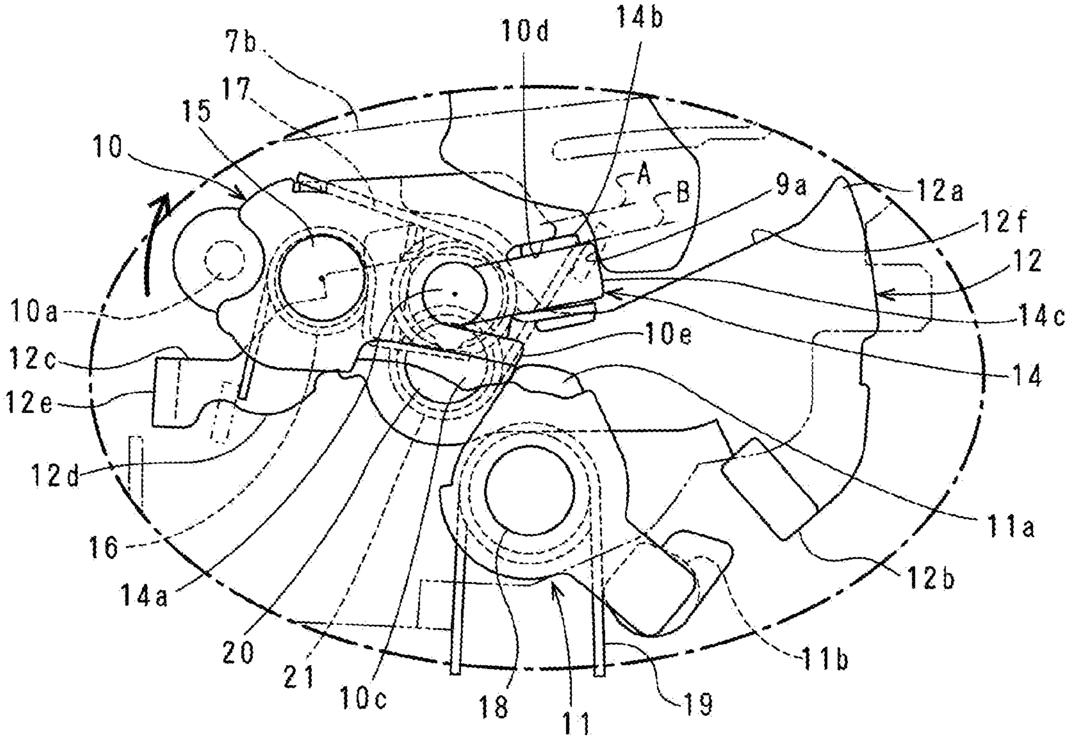
FIG. 14 is an enlarged view taken along the arrow XIV in FIG. 13.

Particularly among the respective members, in the case where the movement of the ratchet 10 is lost, when the ratchet 10 is rotated in the engagement direction (the counterclockwise direction in FIG. 12) from the releasing position shown in FIG. 12 by the biasing force of the spring 16, a so-called unsteady engagement state sometimes occurs, wherein the unsteady engagement state is that the pawl 14 does not steadily engage with the fully-latched engagement portion 9_a_ of the latch 9 stopped in the fully-latched position (or a position where the latch 9 is slightly moved in the opening direction) until it reaches a regular engagement position A as shown in FIG. 13 and in FIG. 14 in which the principal part shown in FIG. 13 is enlarged.

As shown in FIGS. 13, 14, when the unsteady engagement state occurs, the ratchet 10 stops at an unsteady engagement position B (see FIG. 14) where the pawl 14 does not engage with the fully-latched engagement portion 9_a_ until it reaches the regular engagement position A, and the holding lever 11 stops before the blocking position by abutting the holding portion 11_a_ against the tip portion 10_e_ of the ratchet 10. Thus, the ratchet 10 is rotatable in the releasing direction without it is blocked by the holding lever 11. The third latch lever 12 stops in the standby position where the pawl portion 12_a_ enters into the movement locus of the third engagement portion 9_c_ of the latch 9.

Figure 15:
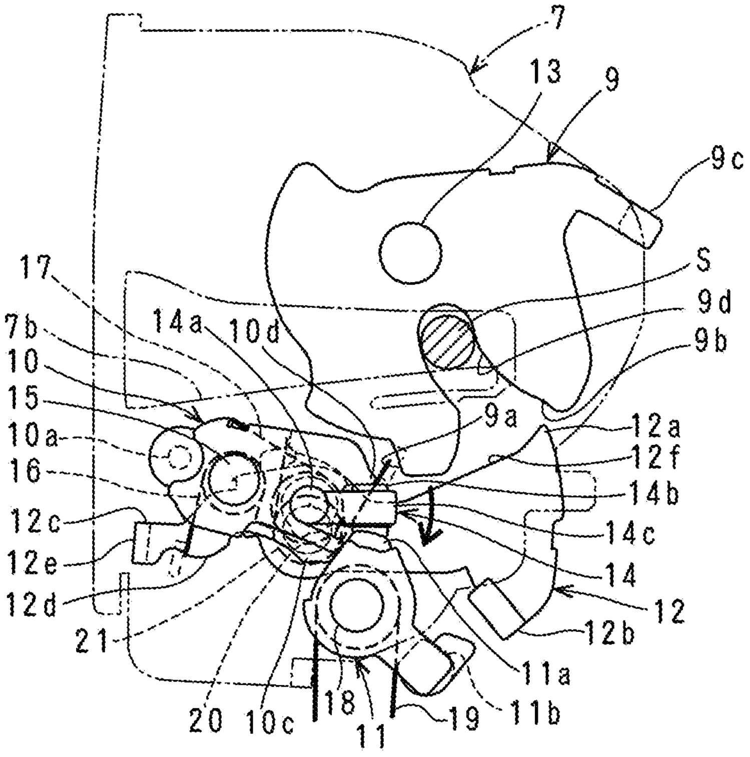
FIG. 15 is a front view showing the principal part when a force in an opening direction operates the latch in the unsteady engagement state.

In the case of the unsteady engagement state, when a large force operates to rotate the latch 9 from the fully-latched position to the opening direction, the ratchet 10 is forcibly rotated in the releasing direction together with the pawl 14 that is unsteadily engaged with the fully-latched engagement portion 9_a_, and thereby disengaging the pawl 14 from the fully-latched engagement portion 9_a_ as shown in FIG. 15. In the worst case, the pawl 14 cannot engage with the half-latched engagement portion 9_b_, and the latch 9 sometimes rotates to the open position.

However, in the case of the motor-vehicle door latch device 1 of the present invention, in the third latch position where the latch 9 rotates in the opening direction from the state shown in FIG. 15 so as to slightly pass the half-latched position, the third engagement portion 9_c_ of the latch 9 engages with the pawl portion 12_a_ of the third latch lever 12 as shown in FIG. 16. Thus, the latch 9 is blocked so as not to further rotate in the opening direction, and is held in the third latch position to keep the engagement with the striker S. Thus, the door is opened slightly more than a half-door state, and is stopped in the door-half-open-state determinable position where the half-open state of the door can be easily determined in appearance, and is not opened further. Therefore, an occupant can surely recognize that the motor-vehicle door latch device 1 had been in the unsteady engagement state.

In order to open the door from the state shown in FIG. 16, any of the outside handle, the inside handle, or the remote control switch is operated to open. Thus, the third latch lever 12 is rotated in the retreating direction (the clockwise direction in FIG. 16) from the standby position, the pawl portion 12_a_ is retreated out of the movement locus of the third engagement portion 9_c_ of the latch 9 to allow the latch 9 to rotate in the opening direction. Simultaneously, the holding lever 11 is rotated in the allowed direction and the ratchet 10 is rotated in the releasing direction so that they are moved to respective positions where the rotation of the latch 9 in the opening direction is not blocked. Thus, the latch 9 is moved to the open position to disengage the striker S from the engagement groove 9_d_ of the latch 9, and thereby enabling the door to be opened.

As described above, in the motor-vehicle door latch device 1 of the present embodiment, in the case of occurring the unsteady engagement state, when the pawl 14 of the ratchet 10 disengages from the fully-latched engagement portion 9_a_ or the half-latched engagement portion 9_b_ of the latch 9, the third latch lever 12 that is a different member from the pawl 14 of the ratchet 10 engages with the third engagement portion 9_c_ provided on the latch 9 in the third latch position of the latch 9 to block the latch 9 from further rotating in the opening direction from the third latch position, and thereby stopping the door in the door-half-open-state determinable position. Therefore, an occupant can surely recognize that the motor-vehicle door latch device 1 had been in the unsteady engagement state.

As described above, the foregoing relates to one embodiment of the present invention, but the present invention is not limited to the above one embodiment and various changes and modifications may be added to the present embodiment without departing from the gist of the present invention. For example, the pawl 14 is possible to be integrated into the ratchet 10, the holding lever 11 is possible to be omitted, and so forth.

What is claimed is:

1. A motor-vehicle door latch device, comprising:

a main body fixed to a door;

a latch that is pivotably supported to the main body at a predetermined angle, is rotated in a closing direction from an open position by engaging with a striker on a vehicle body side when the door is closed, and is capable of moving to a fully-latched position via a half-latched position;

a ratchet pivotably supported to the main body at a predetermined angle and provided with a pawl that blocks the latch from rotating in an opening direction by respectively engaging with a half-latched engagement portion and a fully-latched engagement portion of the latch engaged with the striker; and a third latch lever that is pivotably supported to the main body at a predetermined angle to engage with a third engagement portion provided on the latch when the latch is in a third latch position between the half-latched position and the open position of the latch so that the third latch lever is capable of blocking the latch from rotating in the opening direction from the third latch position by stopping the latch at the third latch position where the third latch lever engages with the third engagement portion.

2. The motor-vehicle door latch device according to claim 1, wherein the third latch lever is provided with a pawl portion capable of engaging with the third engagement portion, and is biased by a first spring to a standby position where the pawl portion enters into a movement locus of the third engagement portion.

3. The motor-vehicle door latch device according to claim 2, wherein the third latch lever moves in a retreating direction from the standby position against a biasing force of the first spring based on a releasing operation of a door-release-operation lever so that the pawl portion retreats from the movement locus of the third engagement portion.

4. The motor-vehicle door latch device according to claim 1, wherein the pawl of the ratchet is pivotably supported to an end portion of the ratchet at a predetermined angle, and is biased in a first engagement direction to respectively engage with the fully-latched engagement portion and the half-latched engagement portion of the latch by a second spring operating the pawl.

5. The motor-vehicle door latch device according to claim 4, wherein the ratchet is biased in a second engagement direction in which the pawl respectively engages with the half-latched engagement portion and the fully-latched engagement portion by a biasing force of a third spring, which is different from the second spring and operates the ratchet.

6. The motor-vehicle door latch device according to claim 1, wherein when the pawl is engaged with the fully-latched engagement portion or the half-latched engagement portion, the ratchet is blocked from rotating in the releasing direction in which the pawl is released from the half-latched engagement portion or the fully-latched engagement portion by abutting against a holding lever that is pivotably supported to the main body at a predetermined angle.

7. The motor-vehicle door latch device according to claim 6, wherein the third latch lever is provided with a pawl portion capable of engaging with the third engagement portion, and is biased by a first spring to a standby position where the pawl portion enters into a movement locus of the third engagement portion, wherein the third latch lever moves in a retreating direction from the standby position against a biasing force of the first spring based on a releasing operation of a door-release-operation lever so that the pawl portion retreats from the movement locus of the third engagement portion, and wherein the holding lever moves from a blocking position in which the ratchet is blocked from rotating in the releasing direction to an allowed direction in which the ratchet is allowed to rotate in the releasing direction, based on the movement of the third latch lever in the retreating direction from the standby position.

8. The motor-vehicle door latch device according to claim 7, wherein the ratchet moves in the releasing direction from the engagement position where the pawl is engaged with the fully-latched engagement portion or the half-latched engagement portion after the holding lever moves in the allowed direction from the blocking position based on the movement of the third latch lever in the retreating direction from the standby position.

9. The motor-vehicle door latch device according to claim 1, wherein the third latch lever is provided with a pawl portion which enters into a movement locus of the third engagement portion to engage with the third engagement portion so that the pawl portion blocks the latch from rotating in the opening direction from the third latch position by stopping the latch at the third latch position where the pawl portion engages with the third engagement portion.

* * * * *